United States Patent

Kersch et al.

[11] 3,649,127
[45] Mar. 14, 1972

[54] HOLOGRAPHIC INTERFEROMETRIC METHOD OF DETECTING ANOMALIES IN LAMINATE STRUCTURE BY REINFORCING ONE LAYER

[72] Inventors: Leonard A. Kersch; Gordon M. Brown, both of Ann Arbor, Mich.

[73] Assignee: GC Optronics, Inc., Ann Arbor, Mich.

[22] Filed: Apr. 20, 1970

[21] Appl. No.: 30,022

[52] U.S. Cl. ................................................356/109
[51] Int. Cl. .............................................G01b 7/02
[58] Field of Search .........................356/106-113; 350/3.5; 73/150

[56] References Cited

UNITED STATES PATENTS 3,509,761    5/1970    Stetson ..................................350/3.5

Primary Examiner—Ronald L. Wibert
Assistant Examiner—Conrad Clark
Attorney—McGlynn, Reising, Milton and Ethington, Martin J. Adelman, Allen M. Krass, Owen E. Perry, Thomas N. Young and Stanley C. Thorpe

[57] ABSTRACT

To analyze the continuity of the adhesive bond between two layers of a laminated structure one of the layers is reinforced by coating its outer side with a substance which forms a stiffening layer and which may be removed in a nondestructive manner. The structure is then stressed, as by heating it, and the resulting deformation is measured by a holographic interferometry. Discontinuities in the pattern of deformation reveal discontinuities in the bond.

9 Claims, 3 Drawing Figures

Patented March 14, 1972
3,649,127
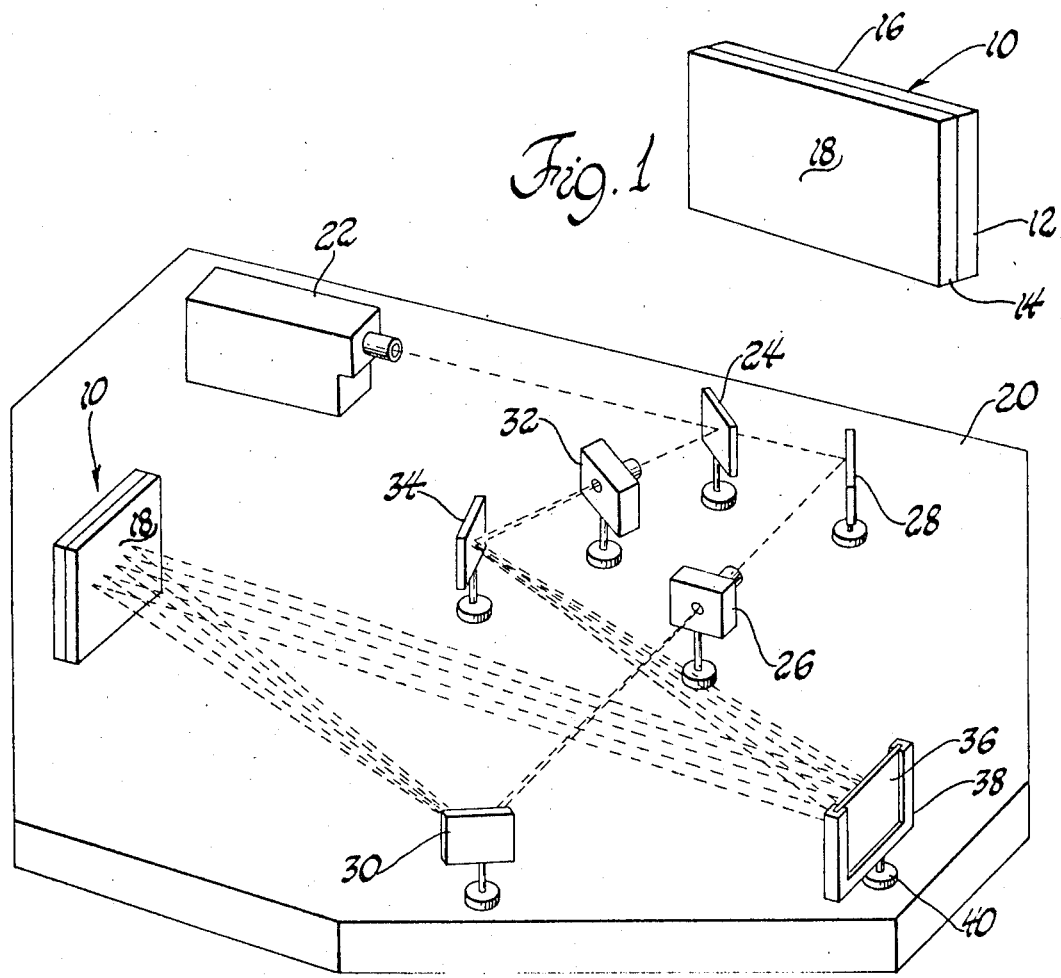
Fig. 1
Fig. 2
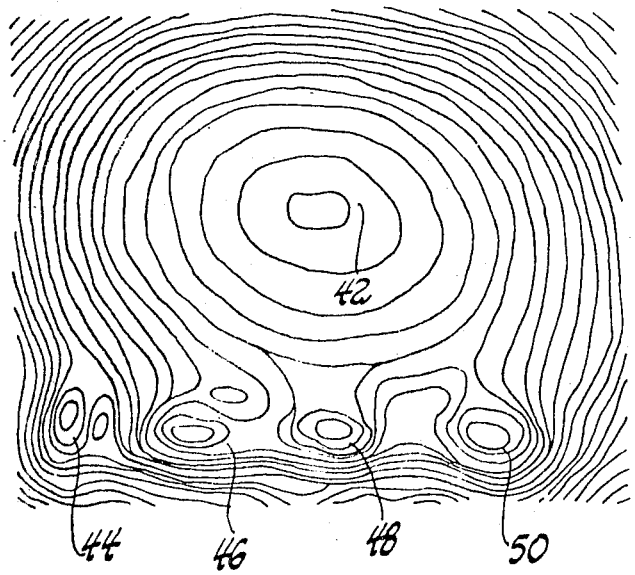
Fig. 3
INVENTORS
Leonard A. Kersch,
Gordon M. Brown
BY
Barnard, McGlynn & Reising
ATTORNEYS

HOLOGRAPHIC INTERFEROMETRIC METHOD OF DETECTING ANOMALIES IN LAMINATE STRUCTURE BY REINFORCING ONE LAYER

This invention relates to a method of analyzing the continuity of an adhesive bond formed between two layers of a laminated structure by effectively restraining one layer and detecting variations in deformation of the structure employing holographic interferometry as the tool of analysis.

Techniques for reconstructing complex optical wave fronts by photographically recording the interference pattern between coherent light and the wave front reflected from an object illuminated by the coherent light have made great advances in the past few years under the impetus of the development of the laser as a source of relatively intense and highly coherent light. A number of forms of such photographic records, or holograms, have been developed. The commonest variety is formed by the exposure of one side of a photographic plate to both coherent light derived from a laser (reference beam) and to light reflected from an object to be studied which is illuminated by the coherent light (object beam). The film effectively records the interference pattern between the two sources and on development bears resemblance to a defraction grating. When it is illuminated by coherent or monochromatic light it defracts the light into a pattern which duplicates the original reflected wave front. Accordingly, an image of the original object may be seen through the illuminated hologram which bears all the optical properties of the original object.

Holographic interferometry employs holograms to detect variations in an object contour or position between two states by comparing the original contour and position of the object as recorded in the hologram with a later contour or position. This may be achieved by one of several techniques. In the double exposure method a hologram is formed by exposing a single photographic plate to the interference patterns created by the reference coherent light and light reflected from the object at two different times. In this manner a pair of holograms are provided on a single plate and upon illumination of the hologram virtual images of each state of the object will be made visible.

If the counter and position of the object with respect to the light source and the photographic plate were identical in the two exposures only a single virtual image will be seen. If the position and/or contours of the object in the two states were substantially different two separate virtual images will be seen. However, if the contour or position of the object change only by a relatively small amount related to the wavelength of the light employed between the two exposures only a single image will be seen but the image will contain fringe lines or darkened areas caused by the interference pattern between the two images. The fringe lines will be arrayed in a pattern which is a function of the displacement of points on the contour of the object between the two exposures and both qualitative and quantative measurement of the movement may be made from such a double exposure hologram.

Another interferometric holographic technique employs the superimposition, at a second time, of the virtual image of the object taken at a first time, with the object itself. This is done by forming an initial hologram of the object and then viewing the object through the hologram so that the virtual image of the object in the first state coincides with the actual object in the second state. Again, any variations in the contour between the two observations will cause fringe lines or shaded areas occur on the superimposed images. These fringe lines will differ slightly from those obtained during a double exposure analysis but effectively will be arrayed in a pattern which is a function of the displacement of points on the object between the two states.

These interferometric techniques have been previously employed to analyze bonds between laminated structures of two dissimilar materials. When forces are imposed on such composite structures, as by loading the structure or heating it, the two dissimilar materials will tend to react to the deforming forces in different manners. If the layers are securely bonded to one another the bond will restrain the occurrence of any differential action; however, any imperfections in the bond will allow a differential reaction to the stress such as separation at unbonded boundaries. By first forming a hologram of such a laminated object, then causing it to deform and detecting anomalies in its deformation pattern by comparing the light wave fronts emanating from the structure before it was deformed, as developed from the original hologram, with the wave fronts emanating from the object after deformation, anomalies in the bond are revealed by anomalies in the fringe pattern resulting from the interference between the two wave fronts. However, this technique has been unsuccessful in testing adhesive bonds between two sections which are sufficiently similar to one another to respond in substantially the same manner to the deforming forces. For example, if two layers of sheet metal of identical composition and thickness are laminated together, they will tend to react in the same way to deforming forced independent of their adhesive bond. Thus, with such structures it is difficult or impossible to analyze discontinuities in the adhesive bond by the aforementioned techniques.

The present invention broadly contemplates stressing a laminated structure while restraining one of the layers of such a structure. The layer is restrained by coating it with a substance which will adhere thereto and change the mechanical properties of the structure of the layer with respect to the adjacent layer or layers of the structure.

One embodiment of our invention involves the technique of forming a hologram of a section of the laminated structure at one value of a controlled variable and then interferometrically comparing the reconstructed wave front from that hologram with the light reflected from the same section while the controlled variable is changed. This technique allows the study of the laminated structure over a continuous interval of time and is in that manner preferable to the double exposure technique which only allows analysis of the deformation occuring between two separate times.

The methods of the present invention allow a completely nondestructive test of a laminated structure.

Other objects, advantages and applications of the present invention will be made apparent by the following detailed description of the several embodiments of the invention. The description makes reference to the drawing in which:

FIG. 1 is an enlarged perspective view of a section of a laminated structure;

FIG. 2 is a perspective view of an optical arrangement for forming a hologram of a section of a laminated structure and for viewing the resultant hologram;

FIG. 3 is a view of the laminated structure in a real time analysis which reveals debonding between the layers of the laminated structure.

The apparatus for practicing either of the two embodiments of the present invention i.e., double exposure analysis or real time analysis, may take substantially the same form. A representative arrangement for detecting debonding between laminated layers of a structure by any of these techniques of holographic interferometry is illustrated in FIG. 2.

A typical laminated structure 10 is composed of a pair of parallel separated thin skin sheets or panel members 12 and 14 of a high strength, low weight material such as magnesium or aluminum. In the formation of the laminated structure thin layers of adhesive are spread uniformly over the interior sides of the two panel members 12 and 14 and the coated sides are then brought against each other so as to form an adhesive bond between the same. The present invention is adapted to test continuity and integrity of the bonds thus formed.

The broad method of the present invention involves coating the outer side 16 of the skin panel 12 with a substance which will adhere to the skin panel 12 and change the mechanical properties of the skin panel 12 with respect to the mechanical properties of the skin panel 14. The broad method of the present invention also involves observing the deformation which occurs in the outer side 18 of the skin panel 14 when the structure 10 is deformed such as by heating or the like. If the adhesive bond between the two skin panels 12 and 14 is continuous and uniform the deformation in the outer panel 14 will be continuous and uniform. Any anomalies and deformation will normally be associated with imperfections in the bond at the point of the anomalie.

The coating material should preferably be applicable in a liquid form so as to obtain a smooth and continuous coating on the material. The material should cure relatively rapidly and upon curing form a relatively stiff surface so as to alter the manner in which the layer thus coated reacts to an imposed stress. The thickness of the layer and the specific nature of the material may be a function of the material to be treated. For example, when a laminate of thin layers of rubber having low tensile modulus of elasticity is coated, a thin coat of lacquer may be sufficient to reinforce the coated layers so that it reacts in the desired manner to the imposed stress. When a heavier material is to be reinforced a thicker layer of material having a higher modulus of elasticity might be required.

It is desirable that the material be of such a composition that it may be removed following the testing without in any way permanently affecting the coated layers. Thus an alcohol soluble lacquer which may be removed following testing by simple sponging with an alcohol solution is highly desirable if it provides proper structural properties.

To conduct the holographic examination, the structure 10 is supported in an upright position on the highly stable table 20 with the outer surface 18 of the panel 14 being positioned to receive coherent light in a manner to be hereinafter described.

The highly stable table 20 may be of granite and may be provided with air cushion supports, not shown, to provide a high degree of stability.

Coherent light for the practice of the holographic methods is derived from a laser 22 which may be of a continuous wave type. Its light output is projected to a beam splitter 24. One beam from the splitter is passed through a spacial filter 26 by means of a mirror 28 and is projected onto a mirror 30. The spacial filter 26 consists of a pinhole and lens assembly, which filters the light therethrough. The mirror 30 projects an area of coherent light onto the surface 18 of the laminated structure 10.

Another beam from the splitter 24 is reflected therefrom and is passed through a second lens and pinhole assembly 32 and is reflected from a mirror 34 onto one surface of a photographic plate 36 disposed in a plate holder 38. The photographic plate 36 also receives reflected light from the surface 18 of the laminated structure 10.

The beam of light projected onto the plate 36 by the mirror 34 will be referred to as the reference beam, while the light reflected to the plate 36 by the illuminated surface 18 of the laminated structure 10 will be termed the object beam.

It is generally desirable that the length of these two beams from the beam splitter to the beam holder the approximately equal.

The plate holder 38 is supported upon a base generally indicated at 40 which is adapted to adjust the position of the plate holder with respect to the other apparatus. This may be done by rotating the plate holder or adjusting it either along a pair of mutually perpendicular lines in a horizontal plane. The plate holder 38 may be of any suitable variety including liquid gate types wherein the photographic plate 36 is immersed in a liquid bath which may be changed so as to successively expose, develop, and fix the photographic plate without physically removing it so as to retain the geometry of the exposure situation.

In the practice of either of the two holographic interferometric techniques the photographic plate 36 is first placed in a holder 38, a laser is turned on and an exposure is made. In a real time or double time method this initial exposure is of a length that is dependent upon the speed of the photographic emulsion and the illumination level and is sufficient to provide adequate recordation of the interference pattern between the reference and object beams without significant object motion.

Following an initial exposure, the laminated structure 10 is deformed, such as by heating the structure at a predetermined temperature for a predetermined period of time. Since the panel 12 of the structure 10 has been stiffened, the panel 14 will tend to bulge out away from the panel 12 in those areas of debond between the two surfaces of the panels. This debonding between the two surfaces will result in non-uniformities in the deformation of the structure when the same is heated which results in contour irregularities which are undetectable by the eye but which may be detected by holographic interferometry.

Following the initial exposure in a real time analysis the plate is suitably developed and fixed either in situs, if the plate holder is so equipped or by removing it for processing, and later reinserting a developed hologram in the plate holder 38. The laser 22 may then be reinitiated and the virtual image recorded by the initial exposure may be seen by viewing through the hologram in the direction of the structure 10. It may be necessary to adjust the relative intensities of the reference and object beams during the viewing process with respect to their intensities during the exposure process. In order to obtain coincidence between the reconstructed virtual image of the structure 10 as seen through a hologram and the structure itself it may be necessary to adjust the position of the plateholder 38. When the virtual image and the actual image of the structure 10 are in substantially exact superimposition any variation of the contour of the surface 18 since the initial exposure will be made apparent.

FIG. 3 illustrates the structure 10 as seen through the hologram with exact superimposition between the real time and reconstructed wave fronts wherein there is exhibited one relatively large fringe anomalie pattern 42 which results from a translation of the structure 10 because of the imposed stresses of heating. However, the smaller fringe irregularities located in the looped areas 44, 46, 48 and 50 result from the failure of the bond between the two sections 12 and 14 at points immediately below these patterns.

The apparatus of FIG. 1 may be alternately employed in a double exposure technique. This is done by initially exposing the panel 14 after the panel 16 has been coated. The laser is extinguished and the structure 10 is heated to a predetermined temperature for a predetermined period of time and then the structure 10 is again exposed to the photographic plate 36 by reflecting light from the panel surface 18 while it is in this second state. Upon development and fixing an observation of the reconstruction of the double exposure hologram can be had by disposing it in the same optical setup in which the plate was exposed. The observer will view the surface 18 of the panel 14 with a superimposed fringe pattern which broadly resembles that obtained during the real time holographic process. While the fringe patterns obtained in the real time and double exposure tests will in all probability differ from one another, anomalies will be located at the same position.

Techniques other than coating one layer of the laminate may be employed to achieve the relative stiffening. For example, the laminate may be adhered to a stiffer section of material by a thermoplastic having a low melting point. After testing the thermoplastic may be easily removed while heated. If the laminate structure is ferromagnetic it may be conveniently stiffened by magnetically securing it to a metal plate. A suitable stiffening layer might also be affixed to the laminate by vacuum means.

The embodiments of the invention in which an exclusive property or privilege is claimed are defined as follows:

1. The method of analyzing the bond between two layers of a laminated structure comprising: restraining the movement of one of said layers so as to increase the rigidity of such layer; simultaneously exposing a photographic media to a reference beam of coherent light and to an object beam consisting of light reflected from a section of the other of said layers when said two layers are subjected to a first value of a controlled variable; developing the photographic media so as to form a hologram of said other layer; superimposing the virtual image of said other layer as seen through the resultant hologram when the hologram is properly illuminated on a second image of said section while said layers are subjected to a second value of the controlled variable; and observing said superimposed images, said superimposed images containing fringe lines arrayed in a pattern which is a function of the bond between said two layers.

2. The method of claim 1 wherein the second image of the other of said sections is created in real time by said section.

3. The method of claim 1 wherein said second image of the section occurs as a result of a second exposure of the photographic media simultaneously to a reference beam of coherent light and to an object beam consisting of coherent light reflected from said section, at a time later than the initial exposure of the photographic media and before the developing of the photographic media so that two holograms are recorded on the same photographic media.

4. The method of claim 1 wherein said two layers are heated between initial exposure of the photographic media and the time of occurrence of the second image.

5. The method of claim 1 wherein said one layer is restrained by coating said one layer with a material which adheres to and changes the mechanical properties of said one layer.

6. The method of claim 5 wherein said structure is heated between initial exposure of the photographic media and the time of occurrence of the second image.

7. The method of analyzing the bond between two layers of a laminated structure, which layers have similar mechanical properties, comprising: coating an exposed surface of one of the layers with a material that substantially increases the rigidity of that layer; forming a hologram of a section of the surface of the other layer while the layers are subjected to a first value of controlled variable; superimposing the wave fronts which emanate from said section of the surface while it is illuminated with coherent light while said layers are subjected to a second value of the controlled variable, with the reconstructed image of said section as derived from the hologram; and observing said superimposed images, said superimposed images containing fringe lines arrayed in a pattern which is a function of the bond between the two layers.

8. The method of claim 7 wherein the coating is achieved by coating a section of one of the layers with a liquid solution of a material which dries to form a relatively brittle layer.

9. The method of claim 8 including removing the coating material after said observation by dissolving it with a solvent.

* * * * *